June 9, 1936. C. T. WALTER 2,043,686
JACKETED EXTRUSION DEVICE
Filed Dec. 7, 1934 2 Sheets-Sheet 1

Charles T. Walter
INVENTOR witness
Wm. C. Meiser

BY
ATTORNEY

June 9, 1936. C. T. WALTER 2,043,686
JACKETED EXTRUSION DEVICE
Filed Dec. 7, 1934 2 Sheets-Sheet 2

Charles T. Walter
INVENTOR

BY
ATTORNEY witness-

Patented June 9, 1936

2,043,686

UNITED STATES PATENT OFFICE 2,043,686

JACKETED EXTRUSION DEVICE

Charles T. Walter, Chicago, Ill., assignor to Industrial Patents Corporation, Chicago, Ill., a corporation of Delaware Application December 7, 1934, Serial No. 756,472

6 Claims. (Cl. 25—8)

This application relates to extrusion devices.

One of the objects of the invention is to provide a jacketed extrusion device.

Another object of the invention is to provide an extrusion device for extruding plastic material in the form of a thin-walled tube.

Another object of the invention is to provide an extrusion device for extruding plastic material in the form of a collapsed ribbon-like tube.

Another object of the invention is to provide a jacketed extrusion device for developing a smooth glossy surface on the material extruded therefrom.

Other objects of the invention will be apparent from the description and claims which follow.

In my application, Serial No. 703,350, filed December 21, 1933, entitled Soap product and method of making the same, and in my divisional application, Serial No. 737,345, filed July 28, 1934, entitled Method of making tube soap, I describe a novel form of soap which may be formed as thin-walled tubes or as ribbons.

As pointed out in my said applications, I have found that tube or ribbon soap prepared in accordance with the inventions there described and claimed, may be given a glossy finish by heating the nozzle of the extrusion plate to a temperature of 160° to 180° Fahrenheit.

The action of the heated nozzle would seem to produce a skin effect on the extruded soap, a very thin film of soap being heated and probably melted. The depth of this heating effect is not sufficient to materially affect the strength of the extruded tube. After being in contact with cool air for a few seconds after leaving the extrusion die, the more or less molten outside film or skin solidifies into a smooth glossy surface which is thereafter retained indefinitely.

The nozzle of the extrusion die may be heated by means of a hot water jacket around its lower end, which provides enough heat to the apparatus to compensate for the heat removed by the stream of soap flowing through it, thus maintaining a constant temperature. Soap containing filler, heat treated as has just been described, gives every appearance of a milled soap not containing filler.

In carrying out the method of the present invention I prefer to use an extrusion device of the type described and claimed in my application, Serial No. 703,351, filed December 21, 1933, entitled Extrusion device.

Although it will be understood that other means such as an electrical heating element may be used, I prefer to use hot water in a jacketed extrusion nozzle such as shown in the accompanying drawings.

Figures 1, 3, 4:
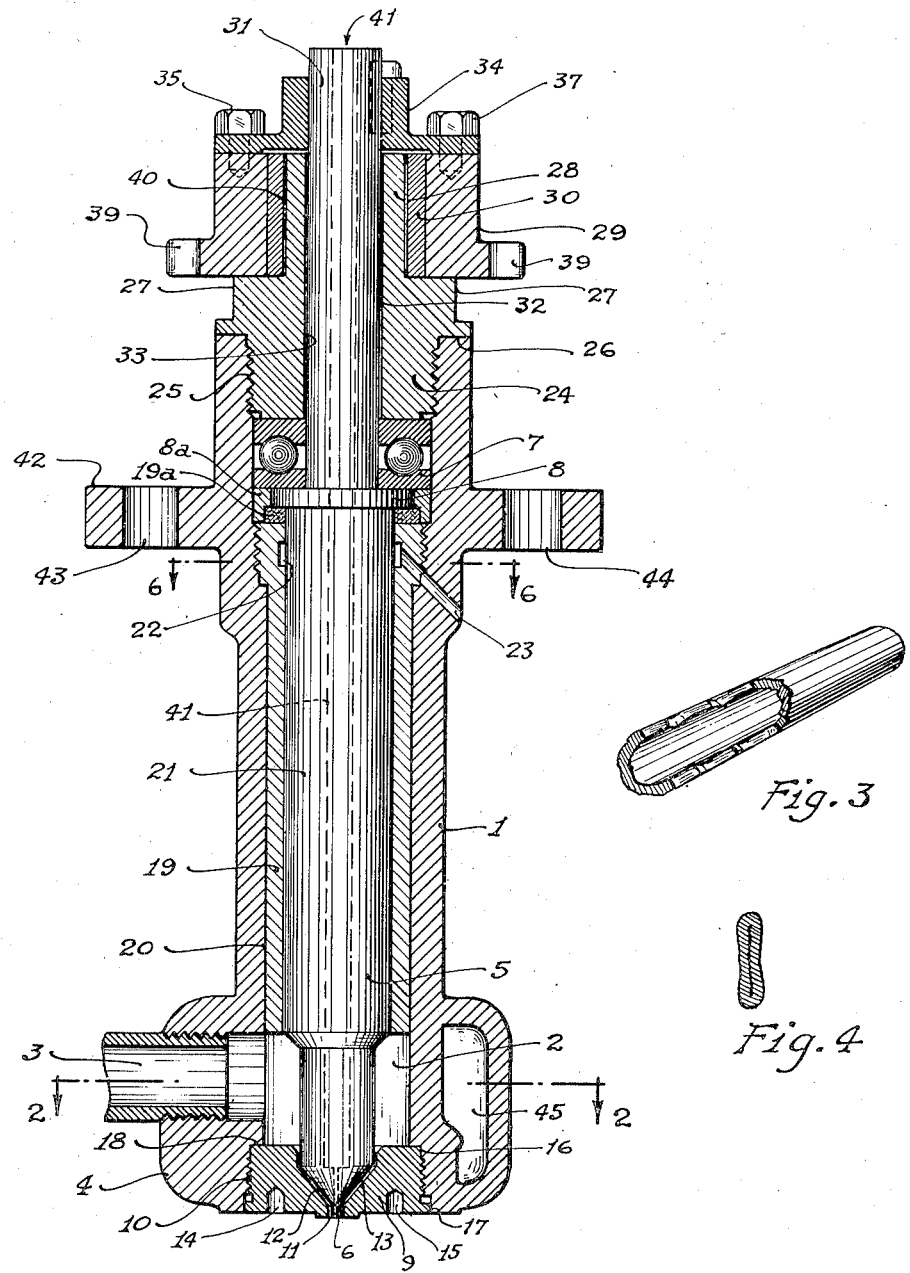
Figure 1 is a sectional view of a preferred embodiment of a water jacketed nozzle.
Figure 3 is a perspective view, partly in section, of a preferred embodiment of the product of the present invention.
Figure 4 is a sectional view of another embodiment of the product of the present invention.
Figures 2, 5, 6:
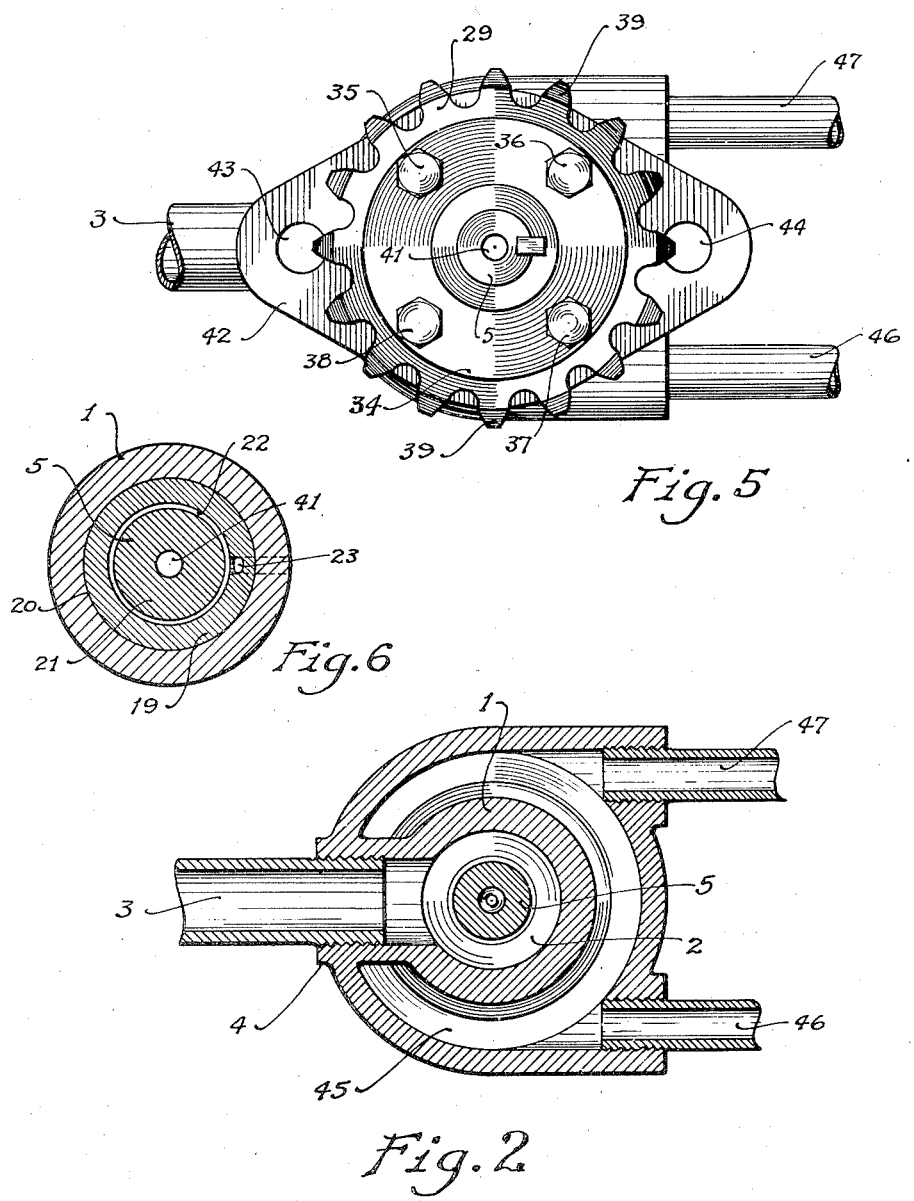
Figure 2 is a section on line 2—2 of Figure 1.
Figure 5 is a plan view of the upper portion of the device shown in Figure 1.
Figure 6 is a section taken on line 6—6 of Figure 1.

Referring now, more particularly, to Figures 1, 2, 5 and 6:

Within casing 1 is a chamber 2 into which soap in a plastic, semi-liquid condition may be forced under pressure through pipe 3 which is threaded in boss 4. Spindle 5 is rotatably mounted within casing 1 and terminates in an extrusion pin 6. Bearing 7 is a thrust ball bearing and takes the thrust load imposed on spindle 5 by virtue of the hydraulic pressure within chamber 2.

This thrust load is transmitted directly to bearing 7 by flange 8 which is integral with spindle 5, rotates in stuffing box 8a, and is separated from bushing 19 by washer 19a. End plate 9 which is screwed into casing 1 by threads 10, and which cooperates with casing 1 to form a housing, is provided with extrusion orifice 11 and base of conical recess 12 in which fits conical end 13 of the spindle 5. Wrench recesses 14 and 15 are provided in end plate 9 to facilitate removal and insertion of the end plate which serves as an extrusion plate.

End plate 9 is guided and held rigidly in a center position with respect to the body portion by means of cylindrical guiding portions 16 and 17. Shoulder 18 limits the depth to which the plate 9 may be screwed into the casing 1. Stuffing box 19 is a cast iron bushing having a press fit in the bore 20 of the body, and acts as a bearing which performs the dual function of guiding the upper end of the spindle 5 in a radial direction.

The stuffing box 19 is preferably machined on the inside so as to form a very close running fit with the enlarged portion 21 of the rotating spindle 5. Stuffing box bushing 19 has an internal groove 22 vented to the outside surface of casing 1 by outlet opening 23, thus preventing soap from being forced from chamber 2 into the upper portion of the device above groove 22.

Nut 24 is screwed into casing 1 by threads 25 and serves to carry the thrust transmitted through bearing 7. It will be noted that nut 24 is designed to screw down solidly against shoulder 26. Flat surfaces are preferably provided on the portion 27 of nut 24 to provide suitable bearing surfaces for a wrench. The upper extremity 28 of nut 24 is machined to a smooth surface to provide a bearing for sprocket 29 which contains a suitable bronze bushing 30. Bushing 30 is designed to permit the sprocket 29 to rotate freely about a bushing portion 28 of nut 24. The driving end 31 passes up through a concentric hole 32 in nut 24. A slight amount of clearance between the driving end 31 of the spindle and nut 24 is indicated at 33. The amount of clearance is not important, it being merely desirable that driving end 31 of spindle 5 not contact the surface of concentric hole 32 in nut 24 since nut 24 is not utilized as a bearing for spindle 5. Flange 34 is firmly attached to the upper end of spindle 5 as by keying or otherwise and is secured to sprocket 29 by bolts 35, 36, 37, and 38, whereby driving force is transmitted from sprocket 29 to spindle 5. Bending and shearing forces resulting from the chain drive on the teeth 39 of sprocket 29 are resisted by bearing 40 and are transmitted directly to the rigid body of casing 1, and consequently only a pure torque is transmitted to the spindle. A breather hole 41 runs the entire length of spindle 5 with an opening at the end of extrusion pin 6.

A flange 42, having holes 43 and 44, is integral with casing 1 and is provided in order that the entire device may be bolted against any suitable supporting member.

Casing 1 is provided with water jacket chamber 45 through which hot water is circulated by way of pipes 46 and 47.

In operation, plastic soap is forced under hydraulic pressure through pipe 3 and thence into chamber 2. From chamber 2 the soap passes through conical passage 12 which leads to the extrusion opening 11 and is distributed uniformly around the spindle head 13, passing out extrusion orifice 11 around extrusion pin 6.

Tube soap in the form illustrated in Figure 3 may be formed at the rate of one hundred feet per minute with the spindle rotating at the rate of 100 R. P. M. In such case it is sufficient merely to leave the breather tube 41 open to prevent collapse of the tube. If it is desired to operate the device at a greater rate of speed, for example to produce tubes at the rate of four hundred feet per minute, the spindle is rotated at the rate of 100 R. P. M. and air is supplied to the breather tube at a pressure of about six to ten inches of water. If it is desired to form ribbons as illustrated in enlarged section in Figure 4, it is desirable to pull a vacuum of about ¾ inch of water on the breather tube to effectually collapse the tube to a flattened ribbon.

The preferred commercial form of the tube soap of the present invention is a plurality of individual pieces having an outside diameter of from .07 to .09 inch and a wall thickness of from .0035 to .0055 inch. The individual pieces may be from one-fourth inch to three-fourths inch in length, being prepared by cutting, as desired, long tubes extruded from the extrusion device in the manner already described.

In the production of the product of the present invention, hot water, preferably at a temperature of about 180° F. is circulated in water jacket 45, care being taken to keep the water temperature fairly constant at that point. The soap enters the device at a temperature of about 70° F. or lower and is extruded in the form of a tube or ribbon as desired. The heat from the water jacket is transmitted through the metal of the extrusion plate and the resulting instantaneous heating effect brings about a highly glossed appearance in the product after extrusion. If desired steam or electricity could be used instead of hot water, suitable provision being made in the extrusion nozzle. The glossed appearance in the product would appear to be the result of melting the outer surface of the tube as it is being formed, permitting the surface particles to run together to form a glaze-like film exhibiting a high polish. The same result may be secured in like manner with the ribbon product.

I claim:

1. An extrusion die comprising a housing having a chamber for the reception of plastic semi-liquid material under pressure and provided with an extrusion plate provided with an extrusion orifice and a spindle rotatable in said housing, a water jacket in said housing whereby heat may be conducted by said extrusion plate to said extrusion orifice and a rotatable extrusion pin located centrally of the orifice, said extrusion pin and the walls of the orifice presenting smooth surfaces to the material and permitting a continuous uninterrupted flow of the material under pressure.

2. An extrusion die comprising a housing having a chamber for the reception of plastic semi-liquid material under pressure and provided with an extrusion plate provided with an extrusion orifice and a spindle rotatable in said housing, heating means in said housing whereby heat may be conducted by said extrusion plate to said extrusion orifice and a rotatable extrusion pin located centrally of the orifice, said extrusion pin and the walls of the orifice presenting smooth surfaces to the material and permitting a continuous uninterrupted flow of the material under pressure.

3. An extrusion die comprising a housing having a chamber for the reception of plastic semi-liquid material under pressure and provided with an extrusion plate provided with an extrusion orifice and a spindle rotatable in said housing, a water jacket in said housing whereby heat may be conducted by said extrusion plate to said extrusion orifice and a rotatable extrusion pin located centrally of the orifice, said extrusion pin and the walls of the orifice presenting smooth surfaces to the material and permitting a continuous uninterrupted flow of the material under pressure, said extrusion pin being integral with said spindle and rotatable therewith.

4. An extrusion die comprising a housing having a chamber for the reception of plastic semi-liquid material under pressure and provided with an extrusion plate provided with an extrusion orifice and a spindle rotatable in said housing, heating means in said housing whereby heat may be conducted by said extrusion plate to said extrusion orifice and a rotatable extrusion pin located centrally of the orifice, said extrusion pin and the walls of the orifice presenting smooth surfaces to the material and permitting a continuous uninterrupted flow of the material under pressure, said extrusion pin being integral with said spindle and rotatable therewith.

5. An extrusion die comprising a housing having a chamber for the reception of plastic semi-liquid material under pressure and provided with an extrusion plate provided with an extrusion orifice and a spindle rotatable in said housing, a water jacket in said housing whereby heat may be conducted by said extrusion plate to said extrusion orifice and a rotatable extrusion pin located centrally of the orifice, said extrusion pin and the walls of the orifice presenting smooth surfaces to the material and permitting a continuous uninterrupted flow of the material under pressure, said extrusion pin being integral with said spindle and rotatable therewith and a breather hole running lengthwise of said spindle and pin.

6. An extrusion die comprising a housing having a chamber for the reception of plastic semi-liquid material under pressure and provided with an extrusion plate provided with an extrusion orifice and a spindle rotatable in said housing, heating means in said housing whereby heat may be conducted by said extrusion plate to said extrusion orifice and a rotatable extrusion pin located centrally of the orifice, said extrusion pin and the walls of the orifice presenting smooth surfaces to the material and permitting a continuous uninterrupted flow of the material under pressure, said extrusion pin being integral with said spindle and rotatable therewith, and a breather hole running lengthwise of said spindle and pin.

CHARLES T. WALTER.